July 24, 1923.
E. D. CLARK
RAT TRAP
Filed March 27, 1923
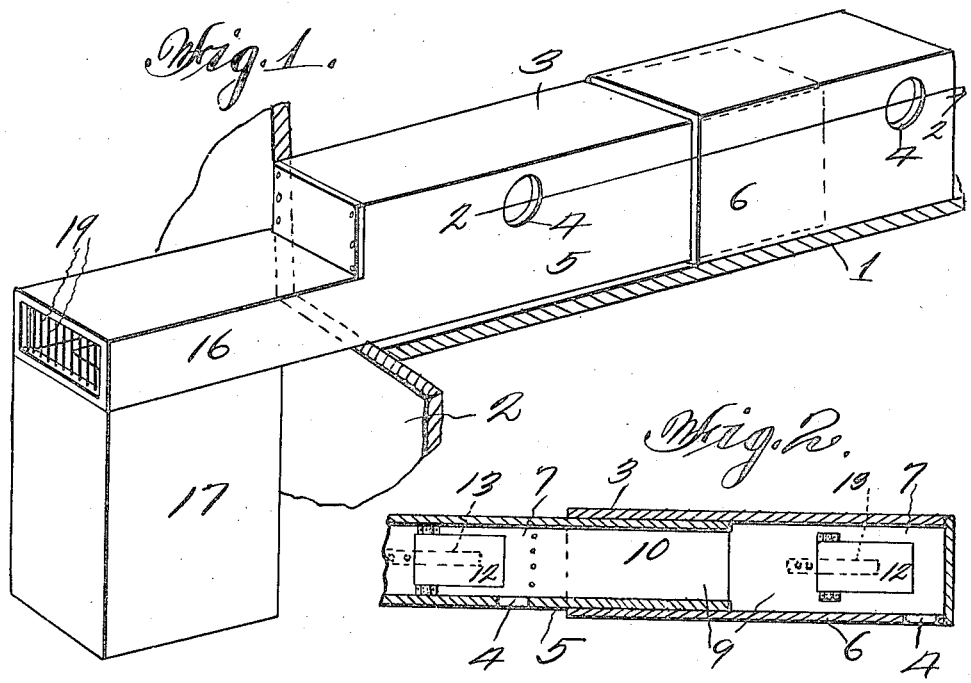
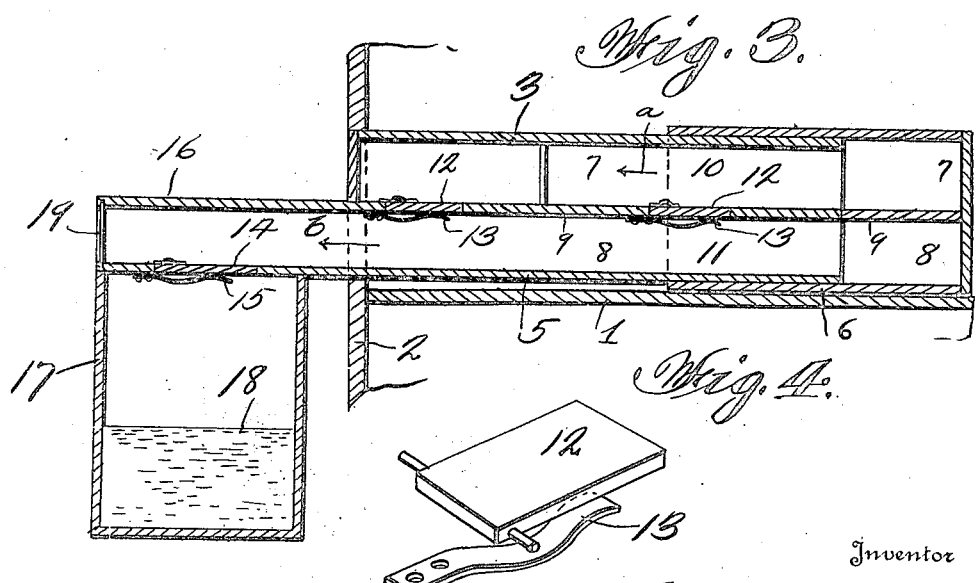
Inventor
E. D. Clark
By D. Swift
Attorney Patented July 24, 1923.

1,462,802

UNITED STATES PATENT OFFICE.

EDWARD DUDLEY CLARK, OF ACHILLE, OKLAHOMA.

RAT TRAP.

Application filed March 27, 1923. Serial No. 628,068.

*To all whom it may concern:*

Be it known that I, EDWARD DUDLEY CLARK, a citizen of the United States, residing at Achille, in the county of Bryan, State of Oklahoma, have invented a new and useful Rat Trap; and I do hereby declare the following to be a full, clear, and exact description of the invention, such as will enable others skilled in the art to which it appertains to make and use the same.

The invention relates to rat traps, and has for its object to provide a device of this character particularly adapted for use in barns and the like and constructed in such a manner whereby a rat will enter the trap through an entrance located adjacent the floor into an elongated compartment, and will pass from said compartment into another elongated compartment through trap doors, which last named compartment extends outside of the building or barn, and is disposed with a trap door disposed over a receptacle having water therein. It has been found that rats have a natural tendency to enter holes adjacent the floor, and also that rats avoid a trap in which other rats are trapped, therefore it is a further object to provide a rat trap having entrances adjacent the floor of a building and an exit into a receptacle located outside of the building.

A further object is to form the body of the trap from telescopically engaged members, thereby allowing the same to be compactly stored and shipped.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:—

Figure 1 is a perspective view of the trap, showing the same on the floor of a building and extending through the outer wall thereof.

Figure 2 is a horizontal sectional view through a portion of the trap taken on line 2—2 of Figure 1.

Figure 3 is a vertical longitudinal sectional view through the trap and a portion of the building.

Figure 4 is a detail collective perspective view of the trap door parts.

Referring to the drawing, the numeral 1 designates the floor of a building, such for instance a barn and 2 the outside wall thereof. Extending through the outer wall 2 of the building is the body 3 of the trap, which body is elongated and rests on the floor 1, where its entrances 4 will be located adjacent the floor in a natural position for rats to enter. The natural tendency of a rat is to run along the floor and enter holes in the floor or adjacent the floor. The elongated body 3 is formed from telescopically engaged sections 5 and 6, which sections are divided into upper and lower compartments 7 and 8 by means of horizontally disposed partitions 9. The partitions 9 are in the same plane and abut each other when the telescopically engaged sections 5 and 6 are brought together, thereby forming upper and lower elongated passages 10 and 11. The rat enters the upper elongated passage 10, and moves in the direction of the arrow *a* passing downwardly through one of the trap doors 12, which are normally held closed by means of springs 13, and thence into the lower elongated passage 11. The trap doors 12 are pivotally mounted in such a manner whereby they will easily open under the weight of the rat. After the rat enters the elongated passage 11, it passes through said passage in the direction of the arrow *b* until it is disposed on the trap door 14, which is of similar construction as the trap doors 12, and is held closed by a spring 15. The end 16 of the body section 3 extends through the wall 2, and has its trap door 14 disposed over a receptacle 17 located outside of the building, and in which receptacle, water 18 is placed. The rat after passing through the trap door 14 drops into the water 18 and is drowned, and the body is located in a position where it will not frighten other rats from entering the entrances 4. To attract the rat in the direction of the trap door 15, the outer end of the extension 16 is provided with a plurality of bars 19, which bars are in spaced relation to each other thereby admitting light to the passage 11 and consequently attracting the rat.

From the above it will be seen that a rat trap is provided, which is simple in construction, particularly adapted for use in connection with barns, warehouses and the like, and one wherein the rat will pass to a receptacle outside of the building, thereby preventing the captured rat from frightening other rats away from the trap.

The invention having been set forth what is claimed as new and useful is:—

1. The combination with the floor of a building, of an elongated trap disposed thereon and having entrances adjacent the floor and longitudinally disposed superimposed passages, trap doors between said passages, one end of said trap extending outwardly through the outer wall of the building, a trap door in the bottom of the lower passage and a receptacle disposed beneath said last named trap door.

2. A rat trap for use in connection with buildings, said trap comprising telescopically engaged sections, said sections being divided into upper and lower compartments by a horizontally disposed partition, trap doors in said partition, entrances in the sections in registration with the upper compartment, the lower compartment terminating outside of the building and having its end screened, a trap door in the lower compartment adjacent the screened end thereof and a water receiving receptacle below said last named trap door and located outside of the building.

In testimony whereof I have signed my name to this specification in the presence of two subscribing witnesses.

EDWARD DUDLEY CLARK.

Witnesses:
  PORTER NEWMAN,
  W. W. GATES.